United States Patent [19]

Hait

[11] Patent Number: 5,086,752
[45] Date of Patent: Feb. 11, 1992

[54] OUTDOOR COOKING UNIT WITH A PEDESTAL STAND

[75] Inventor: Paul W. Hait, Sun River, Oreg.

[73] Assignee: Pyromid, Inc., Redmond, Oreg.

[21] Appl. No.: 589,382

[22] Filed: Sep. 28, 1990

[51] Int. Cl.⁵ .................................. F24C 1/16
[52] U.S. Cl. .......................... 126/9 R; 126/25 R; 126/9 B
[58] Field of Search ............. 126/9 R, 25 R, 29, 26, 126/9 B

[56] References Cited

U.S. PATENT DOCUMENTS

| | | | |
|---|---|---|---|
| 1,403,842 | 1/1922 | Chambers et al. | |
| 2,119,799 | 6/1938 | Sivey | 126/9 |
| 2,237,081 | 4/1941 | Owens | 126/25 |
| 3,327,698 | 6/1967 | Leslie | 126/25 |
| 3,489,131 | 1/1970 | Richins | 126/9 R |
| 3,809,051 | 5/1974 | Giroux | 126/9 R |
| 4,149,514 | 4/1979 | Latauf | 126/25 R X |
| 4,489,706 | 12/1984 | Hait | 126/9 R |
| 4,531,505 | 7/1985 | Hait et al. | 126/9 R |
| 4,624,238 | 11/1986 | Hait | 126/9 R |
| 4,884,551 | 12/1989 | Hait | 126/9 R |
| 4,938,202 | 7/1990 | Hait | 126/9 R |

FOREIGN PATENT DOCUMENTS 1372 of 1915 United Kingdom .

OTHER PUBLICATIONS

Page from book entitled "Gourmet International Barbecue Cookbook The Fine Art of Outdoor Cooking", Apr. 1972 Edition.

Primary Examiner—Larry Jones
Attorney, Agent, or Firm—Jack M. Wiseman

[57] ABSTRACT

An outdoor cooking unit in which a pedestal stand supports above the ground a firebox with an inverted, truncated pyramidal configuration. Disposed within the firebox is a fire grate. A cooking grill is disposed above the fire grate. The pedestal stand includes a pillar having an inverted, truncated pyramidal configuration. The firebox is supported by the pillar of the pedestal stand.

28 Claims, 8 Drawing Sheets

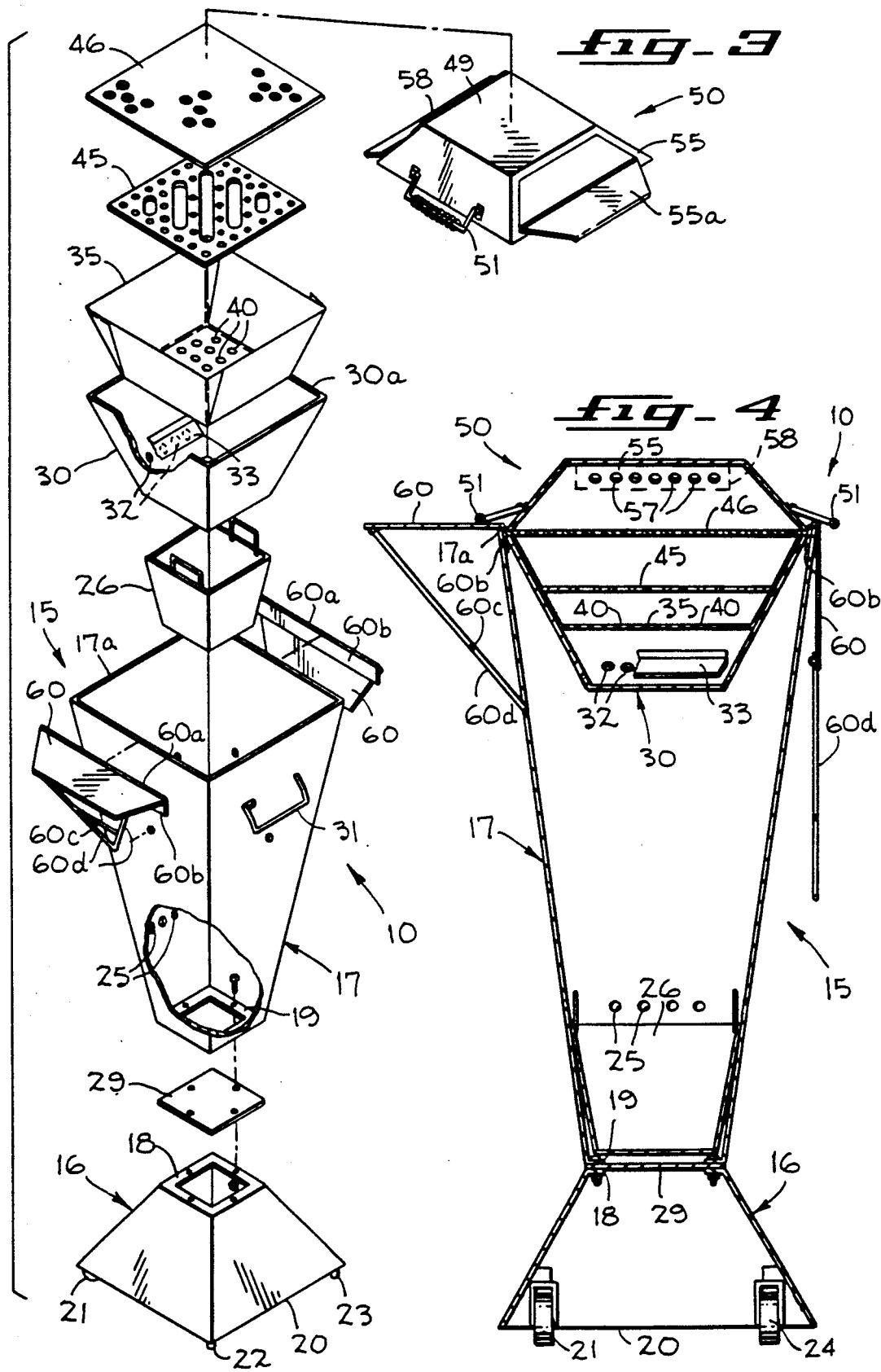

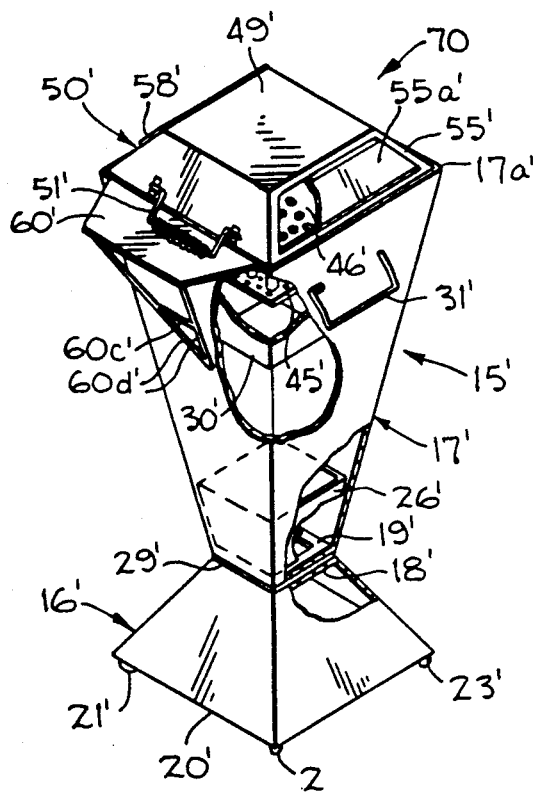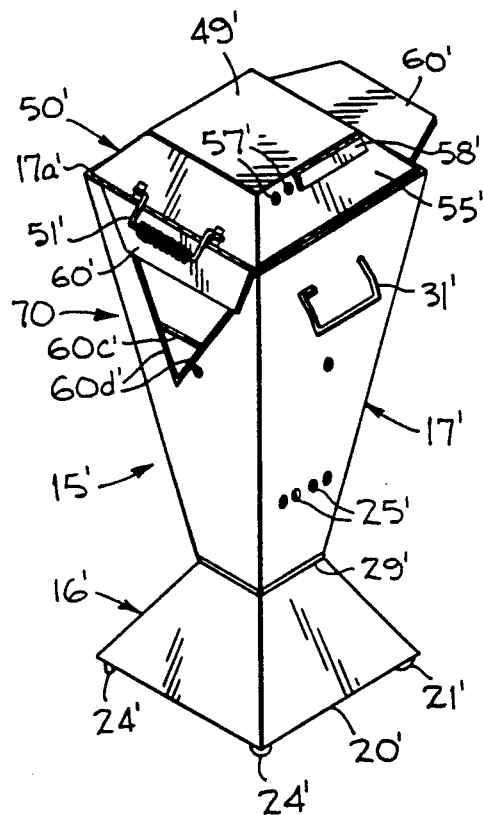

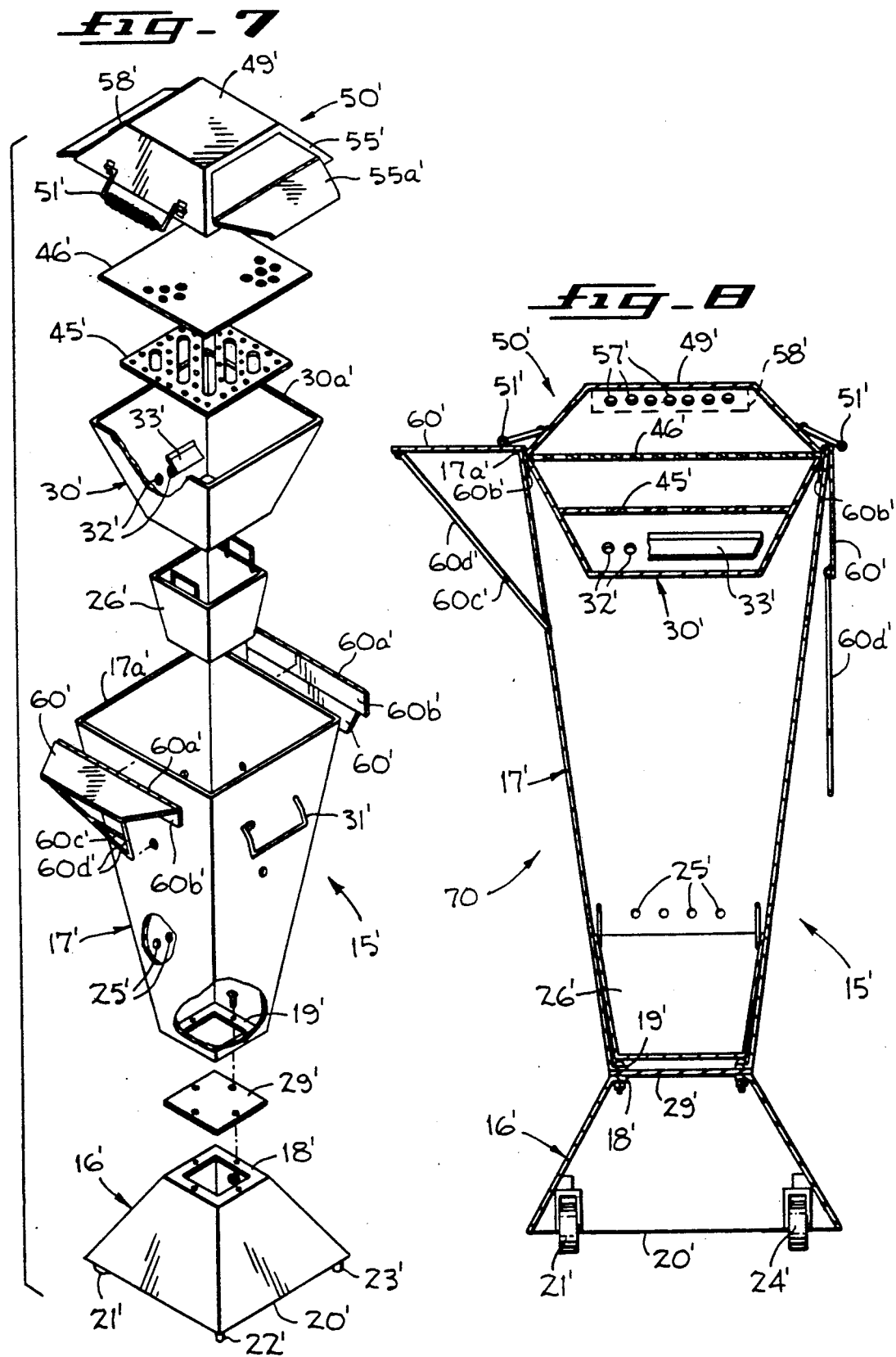

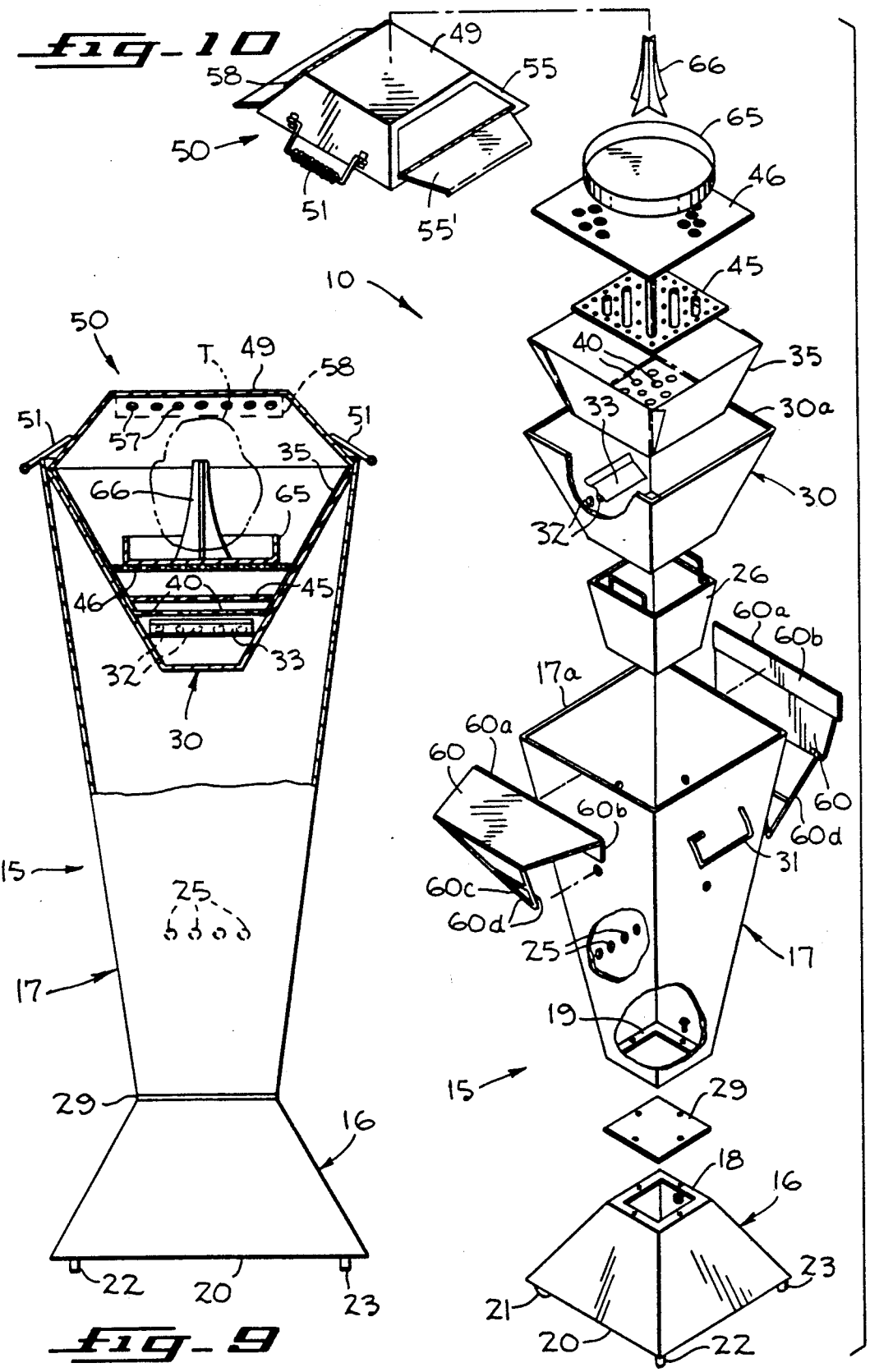

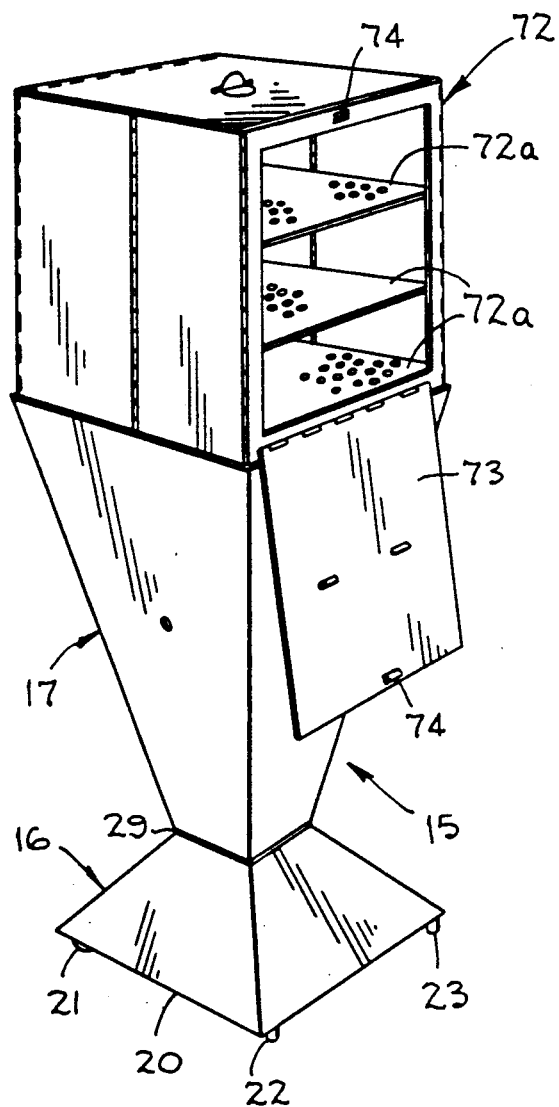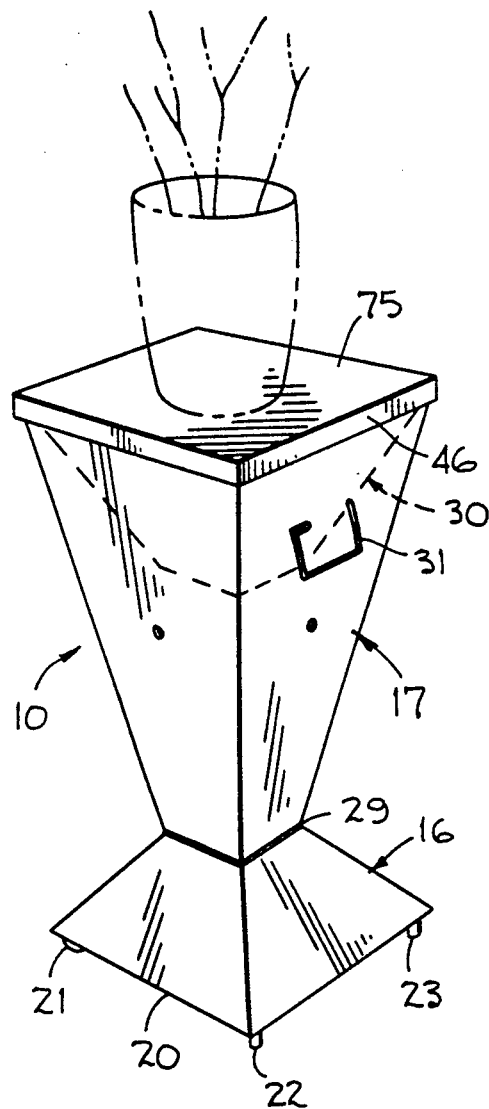

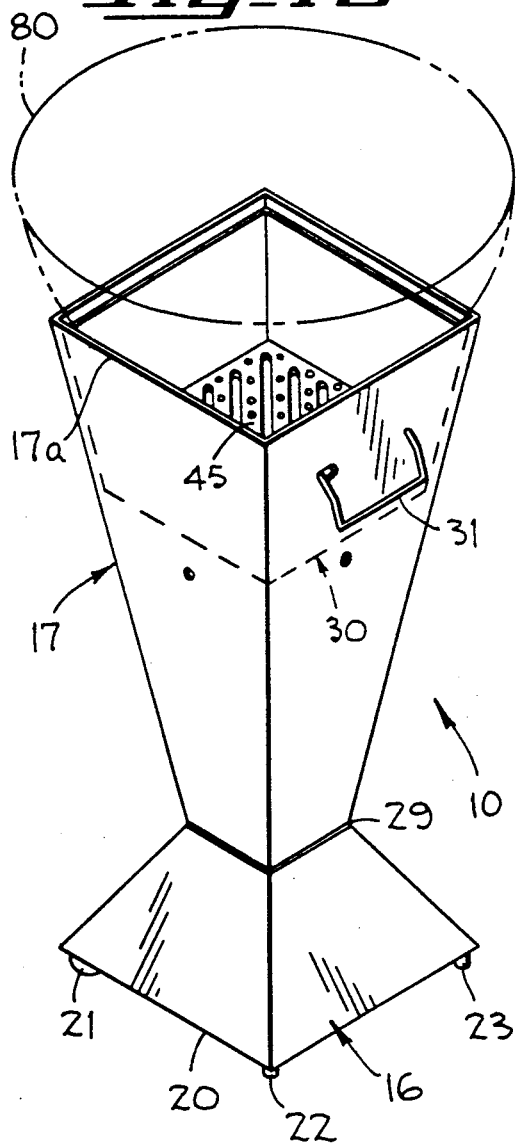
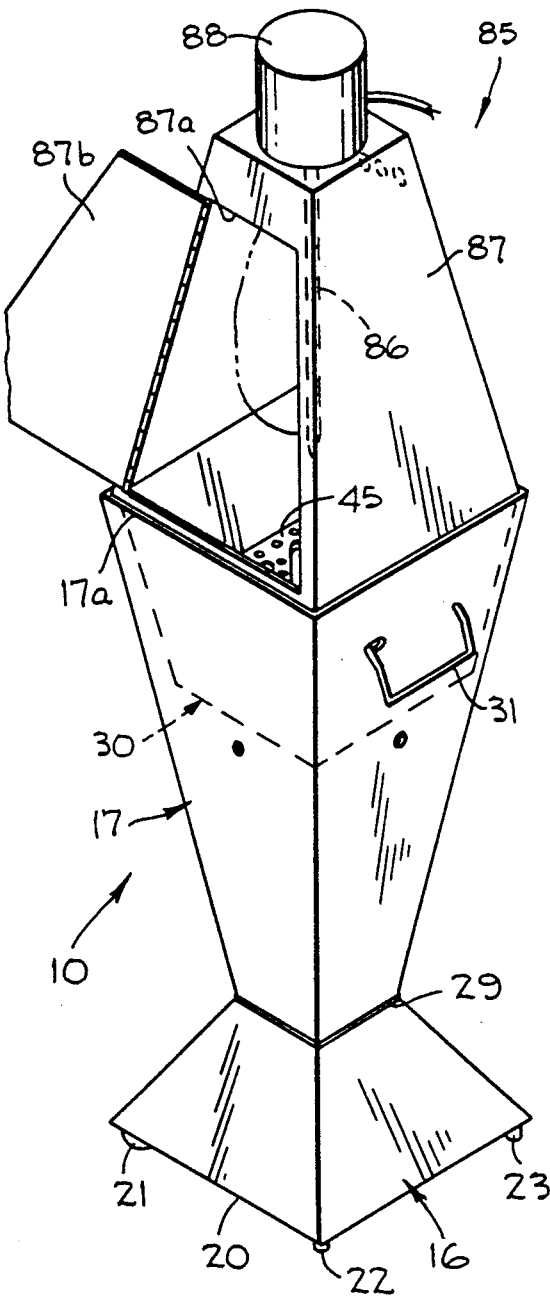

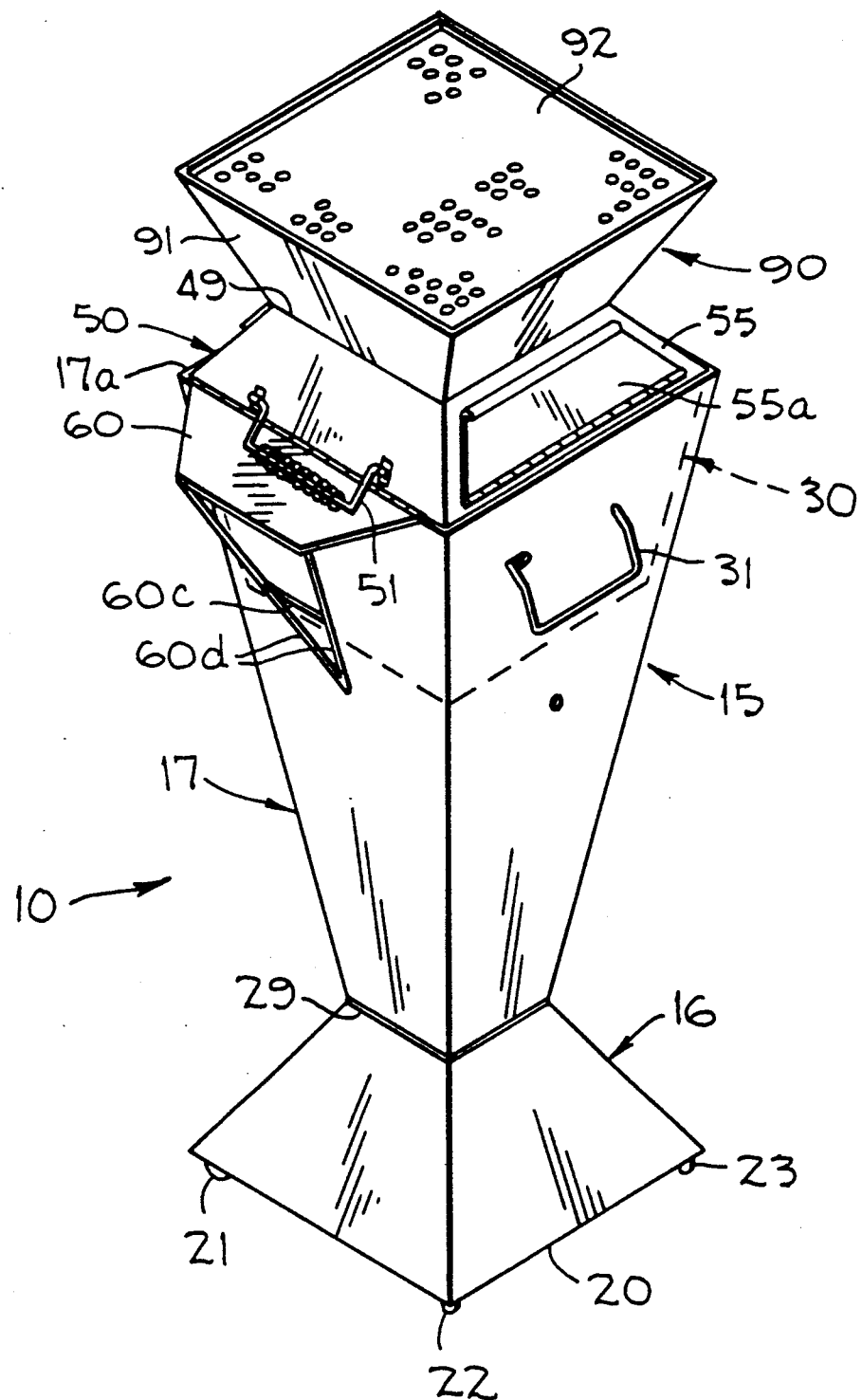

OUTDOOR COOKING UNIT WITH A PEDESTAL STAND

BACKGROUND OF THE INVENTION

The present invention relates in general to outdoor cooking units, and more particularly to an outdoor cooking unit with an upright support stand.

Heretofore, portable outdoor cooking units were supported by carts, tables, tripod arrangements and legs. Such portable outdoor cooking units that did not employ truncated pyramidal fireboxes and cooking chambers are considered to be fuel inefficient, difficult to clean, and difficult for the igniting of briquettes, requiring relatively long time spans for cooling and are cumbersome for relocating and storing.

The Weber Covered Barbeque Kettle has been sold by Weber-Stephen Products Co., which includes a bowl-shaped firebox supported by a tripod-leg arrangement. Positioned within the firebox is a fuel grate on which is disposed briquettes. Positioned within the firebox above the fuel grate is a cooking grill on which food is disposed for cooking. Several legs of the tripod-leg arrangement is supported by wheels and the remaining leg of the tripod-leg arrangement has a rubber or plastic foot. Attached to the bowl are wooden handles. By gripping a handle and tilting the cooking unit, the leg having a rubber foot is lifted from the supporting surface and the cooking unit is movably supported by the wheels. At the bottom of the firebox are dampers for controlling combustion air input to the firebox. Below the dampers at the bottom of the firebox is a pan for catching ashes fallen from the firebox. A bowl-shaped cover is adapted to seat on the bowl-shaped firebox to provide an enclosed cooking chamber. A wooden handle is attached to the cover to enable an operator to remove the cover or seat the cover on the firebox. Dampers are formed in the cover for controlling the venting of air from the cooking chamber into the atmosphere and also controlling the input of combustion air into the firebox.

Outdoor cooking units, particularly outdoor cooking units in which gas is used to ignite the briquettes, are supported by legs and have tables or trays extending from the firebox.

The Hait U.S. Pat. No. 4,624,238, issued on Nov. 25, 1986, for Device Interchangeable As An Outdoor Stove And A Table, discloses a stand for supporting a cooking unit above the ground. The stand is in the nature of a table with detachable legs. The cooking unit comprises a truncated pyramidal support member telescopically receiving an inverted truncated pyramidal firebox. The Hait U.S. Pat. No. 4,624,238, also discloses a hood to form a cooking chamber. A handle extends from the hood and the hood has a hinged top panel.

The Hait U.S. Pat. No. 4,884,551, issued on Dec. 5, 1989, for Outdoor Cooking Unit, discloses a bowl-shaped cooking unit supported by legs above the ground. A removable firebox is suspended within the bowl-shaped vessel. Seated on the firebox is a cooking grill and disposed in the firebox below the cooking grill is a fire grate.

In the Chambers et al., U.S. Pat. No. 1,403,842, issued on Jan. 17, 1922, for Camp Stove, there is disclosed a foldable camp stove supported by hinged legs. The Sivey U.S. Pat. No. 2,119,799, issued on June 7, 1938, for Collapsible Stove discloses a foldable stove supported by angle iron legs.

The Owens U.S. Pat. No. 2,237,081, issued on Apr. 1, 1941, for Cooker And Heater, discloses an outdoor cooking unit supportable close to the ground by feet or elevated above the ground by a foldable rack. The Leslie U.S. Pat. No. 3,327,698, issued on June 27, 1967, for Camp Cook Stove discloses a table with foldable legs for supporting burners for cooking.

In the Richins U.S. Pat. No. 3,489,131, issued on Jan. 13, 1970, for Collapsible Camp Stove, there is disclosed a firebox supported by a plurality of legs. The Giroux U.S. Pat. No. 3,809,051, issued on May 7, 1974, for Portable Barbeque Oven discloses a table for supporting a cooking unit with a firebox. The table is supported by foldable legs.

In the Hait U.S. Pat. No. 4,531,505, issued on July 30, 1985, for Convertible Cooking Unit With An Oven, there is disclosed a cooking unit with a truncated, pyramidal firebox with a hinged access door. An oven is disposed above the firebox. The Hait U.S. Pat. No. 4,938,202, issued on July 3, 1990, for Outdoor Cooking Unit With Disposable Component, discloses an outdoor cooking unit in which an inverted, truncated pyramidal firebox is supported in nested relation on a truncated pyramidal support. A bendable, disposable and non-combustible liner is disposed along the inner surfaces of the firebox and contoured to conform to the configuration of the interior of the firebox.

In the Hait U.S. Pat. No. 4,489,706, issued on Dec. 25, 1984, for Multi-Purpose Fuel Efficient Portable Stove/Heater, there is disclosed a truncated, pyramidal firebox formed with panels having trapezoidal configurations and supported by a stand. Tray-like panels extend from the top of the firebox. The tray-like panels are hinged to the cooking unit. The cooking chamber thereof includes a support frame at the top thereof.

The Noonan U.S. Pat. No. 522,483, issued on July 3, 1894, for Tent And Support, discloses a stove having a conical configuration. An annular flange supports the stove above the ground. The Alsobrook U.S. Pat. No. 1,285,193, issued on Aug. 13, 1918, for Water Heater discloses a conical stove supported by legs above the ground. The British Pat. No. to Hateley, No. 1372, issued on Jan. 28, 1916, for a Fire Bucket Or Stove discloses a firebox for a cooking unit which is supported above the ground by angularly disposed legs. Pyromid, Inc. of Redmond, Oregon, has manufactured and sold a portable cooking unit supported by angularly disposed legs.

SUMMARY OF THE INVENTION

An outdoor cooking unit in which a pedestal stand supports above the ground a firebox. Disposed within the firebox is a fire grate. A cooking grill is disposed above the fire grate.

An outdoor cooking unit in which a pedestal stand supports above the ground a firebox with an inverted, truncated pyramidal configuration. Disposed within the firebox is a fire grate. A cooking grill is positioned above the fire grate. The pedestal stand includes a pillar having an inverted, truncated pyramidal configuration. The firebox is supported by the pillar of the pedestal stand.

An object of the present invention is to provide an outdoor cooking unit that is fuel efficient, and can be cleaned with facility and, yet, is attractive.

Another object of the present invention is to provide an outdoor cooking unit supported above the ground at a convenient height for the operator and, yet, the charcoal briquettes are ignitable with facility and the cooking unit can be cooled relatively quickly.

Another object of the present invention is to provide a cooking unit supported above the ground at a convenient height to the operator and, yet, can be conveniently assembled and disassembled for convenient storage without sacrificing the aesthetic appreciation of the cooking unit.

A feature of the present invention is that the briquettes are ignited from below rather than from above to facilitate the igniting of the briquettes.

Another feature of the present invention is that ash from the burning briquettes is generally contained within the firebox for safety. Should ash escape from the firebox, then the ash escaping from the firebox is contained in an ash box disposed in the pedestal stand.

Another feature of the present invention is the provision of a dead air space between the outer wall of a firebox and the inner wall of a pedestal stand to provide heat insulation.

BRIEF DESCRIPTION OF THE DRAWINGS

FIG. 3 is a diagrammatic exploded view of the outdoor cooking unit shown in FIGS. 1 and 2.

FIG. 4 a diagrammatic vertical sectional view partially in elevation of the outdoor cooking unit shown in FIGS. 1-3 taken along a vertical centerline.

FIG. 5 is a diagrammatic front perspective view partially broken away of a modified outdoor cooking unit embodying the present invention without a foil liner lining the firebox.

FIG. 6 is a diagrammatic rear perspective view of the outdoor cooking unit shown in FIG. 5.

FIG. 7 is a diagrammatic exploded view of the outdoor cooking unit shown in FIGS. 5 and 6.

FIG. 8 is a diagrammatic vertical sectional view partially in elevation of the outdoor cooking unit shown in FIGS. 5-7 taken along a vertical centerline.

FIG. 9 is a diagrammatic elevational view of the outdoor cooking unit shown in FIGS. 1-4 broken away to illustrate an arrangement for cooking fowl, such as a turkey and chicken.

FIG. 10 is an exploded view of the outdoor cooking unit shown in FIG. 9 and particularly illustrating the arrangement for cooking fowl, such as turkey and chicken.

FIG. 11 is a diagrammatic front perspective view of a modified outdoor cooking unit embodying the present invention in which an oven is supported above the pedestal stand and the firebox is disposed within the pedestal stand.

FIG. 12 is a diagrammatic front perspective view of using an outdoor cooking unit embodying the present invention for supporting a flower display, an art object or the like.

FIG. 13 is a diagrammatic front perspective view of an outdoor cooking unit embodying the present invention for heating a wok.

FIG. 14 is a diagrammatic front perspective view of an outdoor cooking unit of the present invention employing a rotisserie with a vertical drive shaft or spit.

FIG. 15 is a diagrammatic front perspective view of an outdoor cooking unit of the present invention employing a heating plate for warming of appetizers, snacks, hors d'oeures, and the like.

DESCRIPTION OF THE PREFERRED EMBODIMENTS

Figure 1:
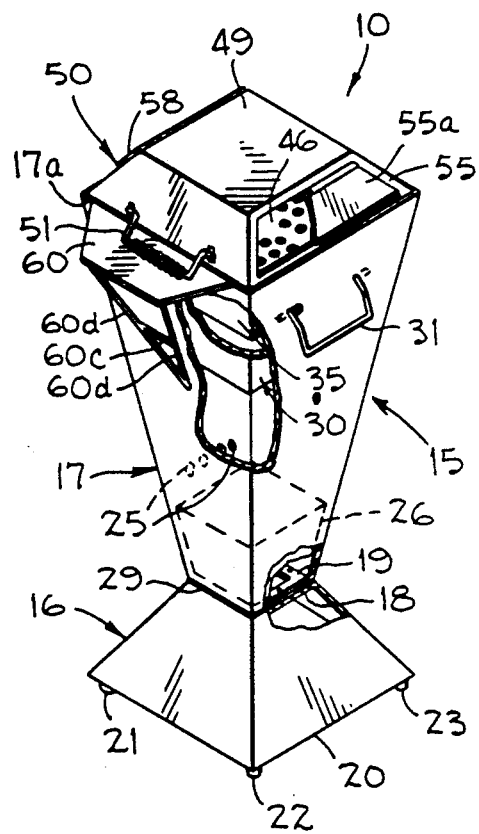
FIG. 1 is a diagrammatic front perspective view partially broken away of an outdoor cooking unit embodying the present invention with a foil liner lining the firebox.
Figure 2:
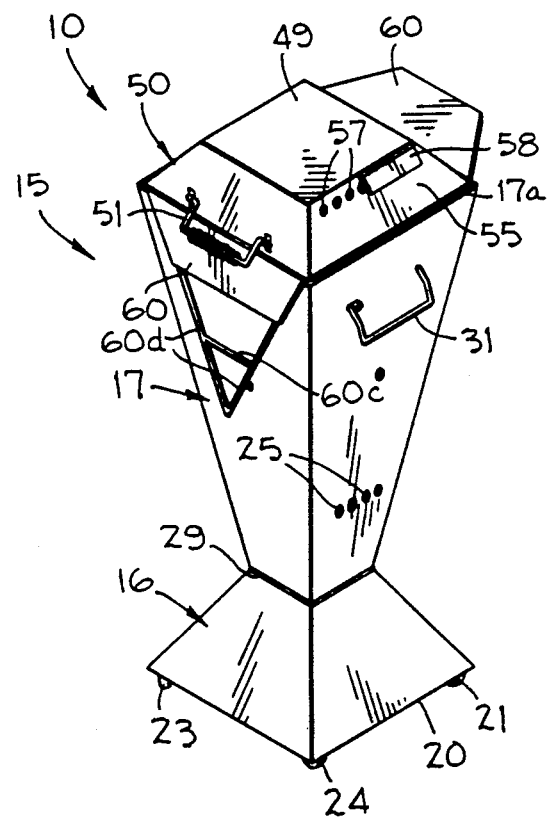
FIG. 2 is a diagrammatic rear perspective view of the outdoor cooking unit shown in FIG. 1.

Illustrated in FIGS. 1-4 is an outdoor cooking unit 10 embodying the present invention, which comprises a pedestal stand 15 for placement on a suitable support surface, such as a patio. In the exemplary embodiment, the pedestal stand 15 is made of suitable material, such as steel. The pedestal stand 15 includes a hollow base 16 that is adaptable for placement on a patio or the like. In the preferred embodiment, the pedestal base 15 has a truncated pyramidal configuration. The pedestal stand 15 also includes a hollow pillar or a hollow, upstanding support 17, which has an inverted, truncated pyramidal configuration. The side panels of the base 16 and the side panels of the pillar 17 have trapezoidal configurations. An upper quadrilateral perimeter 18 of the base 16 supports a lower quadrilateral perimeter 19 of the pillar 17. In the exemplary embodiment, the perimeters 18 and 19 are secured together by suitable means, such as nuts and bolts.

To facilitate the movement of the outdoor cooking unit 10, a bottom plate 20 of the base 16 is supported along one edge thereof by casters 21 and 22. The casters 21 and 22 are generally concealed from view. Along an opposite edge of the base 16 are rubber or plastic feet 23 and 24. Thus, the cooking unit 10 can be tilted slightly to lift the feet 23 and 24 above the supporting surface and thereupon the cooking unit 10 is supported solely by the casters 21 and 22 for movement to another location. A removable handle 31 at the top of the pillar 17 is gripped by an operator for tilting the stand 15 and for moving the tilted outdoor cooking unit 10. The handle 31 is extendable from the pillar 17 for gripping by an operator and is removable from the pillar 17. The handle 31 has outwardly and oppositely directed ends that are received by openings formed in the panel of the pillar 17. When the handle 31 is extended outwardly to be gripped, the oppositely extended ends of the handle 31 engage the inner wall of the panel to be stopped and limited in its outward movement. When the handle 31 is to be inserted into the pillar 17, one end of the handle 31 is first inserted into the cylindrical opening formed in the pillar 17 and the opposite end of the handle 31 is flexed inwardly for insertion into the slotted opening formed in the pillar 17. When the other end of the handle 31 is released, the handle is capable of being extendable for gripping by an operator. To remove the handle 31 from the pillar 17, the other end of the handle 31 is flexed inwardly to be removed from the slotted opening in the pillar 17 and then the one end of the handle 17 is removed from the cylindrical opening formed in the pillar 17. The handle 31 may be surrounded by a wooden cylinder or a metal coil so as to be conveniently gripped by an operator. Also the handle 31 may serve as a support for suspended barbeque implements.

Formed on the pillar 17 are suitable air vents 25 for supplying combustion air to a hollow firebox 30 of the cooking unit 10. In the exemplary embodiment, the firebox 30 is made of stainless steel. In the preferred embodiment, the firebox 30 has an inverted, truncated pyramidal configuration. The firebox 30 is dimensioned and configured at its upper quadrilateral perimeter 30a to abut against the inner walls of the pillar 17 and is suspended therefrom into the pillar 17. The panels of the firebox 30 have trapezoidal configurations in the exemplary embodiment. Formed in the lower section of the firebox 30 are suitable air vents 32 that communicate with the air vents 25 of the pillar 17 for supplying combustion air within the firebox 30. Baffles 33 (FIG. 4) are disposed over the air vents 32 to inhibit soot or ash from escaping through the air vents 32 and the air vents 25.

A plate 29 is removably bolted to and between the perimeters 18 and 19. Seated on the plate 29 is a disposable ash box 26 made of suitable metal foil material, such as aluminum foil. In the exemplary embodiment, the ash box has a truncated pyramidal configuration with suitable handles and engages the adjacent walls of the pillar 17 in contour conforming manner. The metal foil material is bendable, disposable, removable, and non-combustible. In the event ashes drop from the firebox 30, the ashes will fall into the ash box 26 to be removed at the appropriate time. The plate 29 serves as the ultimate stop for ashes in the event ashes drop from the firebox 30 into the pillar 17.

In the preferred embodiment, a metal paper foil liner 35, such as an aluminum foil liner, is disposed within the firebox 30. The foil liner 35 has an inverted, truncated pyramidal configuration with trapezoidal panels. The foil liner 35 is a bendable, disposable and non-combustible liner that is disposed along the inner walls of the firebox 30. The inner sufaces of the foil liner 35 are reflective surfaces. The shape of the foil liner 35 conforms to the configuration of the inner walls of the firebox 30. In the exemplary embodiment, the foil liner 35 is a metallic paper made of tempered aluminum foil having a thickness within the gauge range of 0.001 inches to 0.005 inches. The tempering is the range of 50% to 100%. The foil liner 35 is disposable and is readily flexible to conform to the configuration of the inner surfaces of the firebox 30. Other metallic paper foils may be suitable, such as copper foil and stainless steel foil. Air vents 40 are formed in a bottom wall of the foil 35 in communication with the air vents 32 of the firebox 30 and the air vents 25 of the pillar 17 to provide combustion air within the foil liner 35. The number and size of open air vents 40 will exercise control over the rate of combustion of the fuel.

Disposed within the hollow foil liner 35 is a suitable quadrilateral fire grate 45 on which is disposed suitable fuel, such as briquettes. In the preferred embodiment, the grate 45 is made of stainless steel. The briquettes are ignited, preferably below the fire grate 45, to produce heat for cooking food. Above the grate 45 and disposed within the foil liner 35 is a suitable quadrilateral cooking grill 46 on which is disposed food to be cooked by the heat generated from the firebox 30 and the foil liner 35. In the preferred embodiment, the cooking grill 46 is made of perforated stainless steel. In the exemplary embodiment, the cooking grill 46 is disposed slightly below the upper quadrilateral perimeter 17a of the pillar 17. Optionally, a cooking grill of smaller dimension, but similarly configured, can be disposed within the firebox 35 at a lower height.

The cooking unit 10 of the present invention is fuel efficient. The pyramidal or truncated, pyramidal configuration of the firebox 30 and the truncated, pyramidal configuration of the foil liner 35 are able to reflect a concentrated and a converged source of radiant heat to direct or focus the concentrated and converged radiant heat onto the grill 46 along a conductive path to efficiently cook the food on the cooking grill 46. The stainless steel reflective walls and the metallic paper foil reflective walls efficiently direct the heat along the conductive paths and at the same time isolate the pillar 17 from the heat emanating from the fuel on the fire grate 45. As a result thereof, the pillar 17 remains relatively cool. The pillar 17 remains relatively cool, additionally, from the dead air space between the inner walls of the pillar 17 and the outer walls of the firebox 30. The surface angles of the pyramidal or truncated pyramidal firebox 30 and the surface angles of the truncated pyramidal foil liner 35 direct and focus the radiant heat from the fuel on the fire grate 40 along a path to the cooking grill 46 to efficiently heat the cooking grill 46 and the food thereon.

The pillar 17 and the base 16 remain relatively cool for the safety of the operator. Additionally, the relative coolness of the piller 17 and the base 16 enables the pillar 17 and the base 16 to be painted with low heat paint to lower the cost of production.

In the preferred embodiment, a suitable hollow hood or cover 50 is removably seated along the perimeter of the cooking grill 46 and along the upper, quadrilateral perimeter 17a of the pillar 17. The base of the hood 50 has a quadrilateral shape configured to conform to the shape of the upper perimeter 17a of the pillar 17 and the cooking grill 46. The hood 50, in the preferred embodiment, has a truncated pyramidal configuration and is made of stainless steel. In the exemplary embodiment, the hood 50 seats on the inner wall of the pillar 17 above and adjacent to the cooking grill 46 and in alignment with the firebox 30. The quadrilateral shape of the base of the hood 50 conforms to the contour of the quadrilateral configuration of the top of the firebox 30. At its bottom, the hood 50 is open and at the top the hood 50 is closed to provide a cooking chamber for cooking the food on the cooking grill 46. The cooking unit 10 cools relatively fast by virtue of the reflection of heat by its reflective stainless components and also by virtue of the foil liner 35 capability of being removed from the firebox 30.

The hood or cover 50 can be formed with various height configurations depending on the food being cooked and also depending on the desired appearance. In the preferred embodiment, the hood 50 is formed with a flat top 49 to form a suitable surface for heating a pot, a pan or other cooking utensil. The flat top 49 may be hinged along one edge of the top section of the hood 50 for venting the top of the hood 50 by pivoting the top plate 49 so that the top plate 49 is spaced from the top panel of the hood 50 on which it seats. Also, the hood 50 may be hinged to the top of a panel of the pillar 17 so as to be capable of being pivoted along an exterior wall of the panel to which it is hinged. The hood 50 may also be hinged midway between side panels thereof. In this manner, the hood 50 is foldable for convenient storage.

The side panels of the hood 50 have trapezoidal shapes. At least one handle 51 extends outwardly from a panel of the hood 50. In the preferred embodiment, the handle 51 is made of of a metal coil or may be made of suitable material that is a poor conductor of heat, such as wood, so as to be cool when gripped by an operator. Formed in the hood 50 are suitable air vents 57 for hot air to vent from the cooking chamber of the hood 50 into atmosphere. One panel 55 of the hood 50 provides a door 55a that is hinged at the lower edge thereof. The door 55a, when opened, provides access to the food cooking on the grill 46. Above the air vents 57 and on the panel of the hood 50 in which the air vents 57 are formed is a pivotal flap 58 to optionally cover the air vents 57. The closing of the air vents 57 by the pivotal flap 58 interrupts the flow of air into the hood 50 for extinguishing the burning of the fuel, such as briquettes.

In the preferred embodiment, suitable trays or tables 60 extend outwardly from the top of the pillar 17. Each tray 60, in the exemplary embodiment, has a trapezoidal configuration and is made of suitable material, such as stainless steel. Each tray has a hinge 60a (FIG. 3) and a depending flange 60b along the widest edge of the parallel edges of the tray 60 to engage an outwardly projecting contiguous edge of the upper perimeter 17a of the pillar 17. The hinge 60a and the depending flange 60b are locked between the pillar 17 and the firebox 30 (FIG. 4). Thus, the tray 60 is movable between a horizontal position to be used as a convenient support surface and a depending position against a panel of the pillar 17 when the tray is not in use.

When the tray 60 is in the horizontal position, legs 60d and cross-piece 60c are pivotally connected to the underside of the tray 60. The legs 60d form a V-shape and are pivotally connected to the tray 60 at the outboard end thereof. The legs 60d extend in a diagonal converging direction downwardly from the tray 60 toward the panel of the pillar 17. The lower end of the legs 60d join to be received by an opening in the panel of the pillar 17 (FIGS. 3 and 4). The lower ends of the legs 60d engage the wall surrounding the opening formed in the panel of the pillar 17. When the tray 60 is in the depending position against the panel of the pillar 17, the lower ends of the legs 60d hang freely against the panel of the pillar 17. The legs 60d are moved until the tray 60 assumes a dependent position against the panel of the pillar 17. To move the tray 60 to a horizontal position, the tray 60 is raised by an operator to the horizontal position and the legs 60d enter the opening and engage the wall surrounding the hole for supporting the tray 60 in the horizontal position. While the exemplary embodiment of the present invention shows two trays 60 extending from the top of the pillar 17, it is apparent that the trays 60 can extend from one or more of the remaining panels of the pillar 17.

The truncated pyramidal hood 50 is disposed above the inverted, truncated firebox 30 and in alignment therewith to form a generally ten-sided figure. The firebox 30 is suspended within the pillar 17. The space between the pillar 17 and the firebox 30 provide a dead air zone which serves as heat insulation between the outer walls of the firebox 30 and the inner walls of the pillar 17.

Illustrated in FIGS. 5-8 is an outdoor cooking unit 70, which is a modification of the outdoor cooking unit shown in FIGS. 1-4. Components of the outdoor cooking unit 70 similar in structure and function to the components of the outdoor cooking unit 10 will have the same reference numeral but with a prime suffix.

The outdoor cooking unit 70 differs from the outdoor cooking unit 10 in that a foil liner is not used. Hence, a fire grate 40' will seat within the firebox 30' and engage the interior walls of the firebox 30' to be supported thereby. In a similar manner, a cooking grill 46' will seat on the upper quadrilateral perimeter 17a' of the pillar 17' or seat within the firebox 30' above the fire grate 40' and engage the interior walls of the firebox 30' to be supported thereby. The manner of supporting the cooking grill 46' is dependent on its relative dimensions, which is determined by the food to be cooked by the cooking unit 70. In all respects, other than the use of a foil liner, the cooking units 10 and 70 are similar. Below the air vents 32' of the firebox 30' is an ash collection zone in which ashes are collected at the bottom of the firebox 30'. Ash that falls from the firebox 30' will be collected in the ash box 26'.

The truncated, pyramidal configuration of the firebox 30' reflects a concentrated and converged source of radiant heat to direct or focus the concentrated and converged radiant heat onto the grill 46' along a conductive path to efficiently cook the food on the cooking grill 46' in a fuel efficient manner. The stainless steel reflective walls efficiently direct the heat along the conductive paths and at the same time isolate the pillar 17' from the heat emanating from the fuel on the fire grate 45'. As a result thereof, the pillar 17 remains relatively cool. The pillar 17' remains relatively cool, additionally, from the dead air space between the inner walls of the piller 17' and the outer walls of the firebox 30'. The surface angles of the pyramidal or truncated pyramidal firebox 30' direct and focus the radiant heat from the fuel on the fire grate 40' along a path to the cooking grill 46' to efficiently heat the cooking grill 46' and the food thereon.

Illustrated in FIGS. 9 and 10 is the outdoor cooking unit 10 adapted for cooking fowl, such as a turkey and chicken. As shown in FIGS. 9 and 10, the cooking grill 46 is smaller in perimetric dimension to engage the walls of the foil liner 35 closer to the fire grate 40 and, hence, deeper into the firebox 30. A turkey and chicken can also be cooked by the cooking unit 70 in which event the cooking grill 46' is smaller in perimetric dimension to engage the walls of the firebox 30' closer to the grate 40' and, hence, deeper into the firebox 30'. Seated on the grill 46 or the grill 46' is a suitable pan 65 for collecting the grease run-off from the fowl T during the cooking of the fowl T. The pan 65 is greater in dimension than the widest and longest dimension of the fowl T. To maintain the fowl T above the bottom of the pan 65 and the collected grease, a conventional V-stand 66 is seated in the pan 65 and the fowl T is seated on and supported by the V-stand 66. Dependent on the size of the fowl T, the fowl T may extend into the cooking chamber of the hood 50 or 50'.

It is within the contemplation of the present invention that the hood or cover, such as hood 50 or hood 50', may not be used while food is cooking on the cooking grill 46 or the cooking grill 46'. Should it be desired to use the outdoor cooking unit 10 or the outdoor cooking unit 70 for baking, the associated hood is removed and in lieu thereof a suitable outdoor oven, such as oven 72 (FIG. 11), is placed over the cooking grill, such as the cooking grill 46 or 46'. The oven 72, in the preferred embodiment, is dimensioned and configured to conform to the configuration of the upper perimeter 17a or 17a' of the pillar, such as pillar 17 or 17'. In the preferred embodiment, the oven 72 is made of stainless steel. A suitable hinged door 73 is hinged to the lower forward edge of the oven 72 for opening and closing the cooking chamber of the oven 72.

In the exemplary embodiment, the oven 72 has a hinged door 73 that pivots about the lower forward edge of the oven (FIG. 11). A suitable latch 74 detachably secures the free edge of the door 73 that is parallel to the hinged edge. Through this arrangement, the door 73 can be opened for access to the baking chamber and can be closed for the baking of food within the oven 72. It is within the contemplation of the present invention that the oven 72 is foldable and collapsible for storage. Diffuser plates 72a are placed within the oven 72 above the briquettes to isolate the food in the oven 72 from direct exposure to the briquettes.

Illustrated in FIG. 12 is the cooking unit 10 converted into a pedestal stand to support a flower pot, art object, or the like. The cooking unit 10 has the hood or cover 50 removed. Placed above the cooking grill 46 and seated on the upper quadrilateral perimeter 17a of the pillar 17 in lieu of the hood 50 is a suitable table top 75 dimensioned and configured to conform to the configuration of the upper perimeter 17a. In a similar manner, the cooking unit 70 is converted into a pedestal stand for supporting a flower pot, art object, or the like. Stored within the pillar 17 are the firebox 30, the fire grate 46, and the cooking grill 47.

It is within the contemplation of the present invention that the hood 50, or the oven 72, or the hood 50', may not be used for cooking food. Should it be desired to use the outdoor cooking unit 10 or the outdoor cooking unit 70 for cooking in a wok, the hood is removed and in lieu thereof a suitable wok 80 (FIG. 13) is placed over the firebox 30 or the firebox 30'. The wok 80, in the preferred embodiment, is dimensioned to seat on the upper perimeter 17a of the pillar 17 (or on the perimeter 17a' of the pillar 17) above the fire grate 45.

Illustrated in FIG. 14 is the cooking unit 10, or it may be the cooking unit 70, employing a rotisserie 85 with a vertical shaft or spit 86. Toward this end, the cooking grill and the cover are removed. The fuel grate 45 is of greater dimension and is disposed closer to the quadrilateral perimeter 17a of the pillar 17. The fuel grate 45 is supported by the inner walls of the pillar 17 adjacent the quadrilateral perimeter 17a.

Supported by the inner walls of the pillar 17 adjacent the quadrilateral perimeter 17a and above the fire grate 45 is a rotisserie hood 87. The rotisserie hood 87, in the preferred embodiment, is made of stainless steel. The rotisserie hood 87, in the preferred embodiment, has a truncated pyramidal configuration. The bottom perimeter of the hood 87 has a quadrilateral shape configured and dimensioned to conform to the quadrilateral configuration of the top of the pillar 17.

Mounted on the top of the hood 87 is a suitable motor 88. The vertically disposed rotatable shaft or spit 86 is driven by the motor 88. Food to be cooked is carried by the spit 86 for rotation above the fuel grate 45. Formed in one of the panels of the hood 87 is an access opening 87a. A hinged door 87b opens and closes the access opening 87a. The hood 87 is formed with suitable vents along an upper section of a panel thereof for proper ventilation.

Illustrated in FIG. 15 is a warming unit 90 for warming appetizers, snacks, hors d'oeures, and the like. The warming unit 90 comprises a hollow, inverted, truncated pyramidal support 91. The bottom of the support unit 91 has a lower quadrilateral perimeter that receives the top of the hood 50 or the hood 50'. The support 91 seats on the hood 50 or the hood 50' in telescoping relation. Seated on an upper quadrilateral perimeter of the support 91 is a suitable warming grill 92 on which is disposed appetizers, snacks, hors d'oeures, and the like. The heat rising out of the hood 50 or the hood 50' serves to heat the warming grill 92 for heating the appetizers, snacks, hors d'oeures, and the like thereon.

What is claimed is:

1. An outdoor cooking unit comprising:
   (a) a hollow firebox;
   (b) a fire grate disposed in said firebox on which fire grate fuel is supported;
   (c) a cooking grill disposed above said fire grate on which cooking grill food is supported; and
   (d) a pedestal stand elongated in the upright direction for supporting said firebox above the ground at a convenient height for an operator, said pedestal stand including an upstanding elongated hollow member having an inverted, truncated pyramidal configuration and a quadrilateral upper perimeter,
   (e) said firebox having an inverted truncated pyramidal configuration and a quadrilateral upper perimeter, said firebox being disposed generally entirely within said upstanding hollow member of said pedestal stand, said firebox being configured and dimensioned for the upper perimeter of said firebox to be supported by said upstanding member of said pedestal stand at said quadrilateral upper perimeter of said upstanding hollow member.

2. An outdoor cooking unit as claimed in claim 1 comprising a removable ash receptacle disposed within said upstanding member to receive ash discharged into said upstanding member of said pedestal stand.

3. An outdoor cooking unit as claimed in claim 1 and comprising a hollow cover disposed on said upper quadrilateral perimeter of said upstanding member of said pedestal stand above said cooking grill to form a cooking chamber, said cover having a truncated pyramidal configuration and a lower quadrilateral perimeter dimensioned and configured to be supported by said upstanding member of said pedestal stand, said cover being opened at its lower quadrilateral perimeter for communicating with said firebox.

4. An outdoor cooking unit as claimed in claim 3 wherein said cover includes a plurality of side panels, each of said side panels having a trapezoidal configuration, one of said panels of said cover having an access opening, said cover including a door pivotally attached to said one panel for opening and closing said access opening.

5. An outdoor cooking unit as claimed in claim 3 wherein said firebox and said cover are made of stainless steel.

6. An outdoor cooking unit as claimed in claim 3 and comprising a motor with a vertically disposed spit supported by said cover.

7. An outdoor cooking unit as claimed in claim 3, said cover having an upper quadrilateral perimeter, said cooking unit comprising a hollow, inverted, truncated pyramidal support receiving said upper quadrilateral perimeter of said cover and seating on said cover, and a warming grill seated on said support above said cover for heating food.

8. An outdoor cooking unit as claimed in claim 1 wherein said upstanding member of said pedestal stand is formed with air vents for combustion air from the atmosphere to enter said upstanding member of said pedestal stand, said firebox is formed with air vents communicating with the air vents of said upstanding member of said pedestal stand for combustion air from the atmosphere to enter said firebox.

9. An outdoor cooking unit comprising:
   (a) a hollow firebox;

(b) a fire grate disposed in said firebox on which fire grate fuel is supported;
(c) a cooking grill disposed above said fire grate on which cooking grill food is supported;
(d) a pedestal stand elongated in the upright direction for supporting said firebox above the ground at a convenient height for an operator, said pedestal stand including an upstanding elongated hollow member having an inverted, truncated pyramidal configuration and a quadrilateral upper perimeter,
(e) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand,
(f) said upstanding member of said pedestal stand having a lower quadrilateral perimeter, said pedestal stand including a base having an upper quadrilateral perimeter; and
(g) means securing said lower quadrilateral perimeter of said upstanding member of said pedestal stand to the upper quadrilateral perimeter of said base of said pedestal stand.

10. An outdoor cooking unit as claimed in claim 9 wherein said base of said pedestal stand has a truncated pyramidal configuration.

11. An outdoor cooking unit comprising:
(a) a hollow firebox;
(b) a fire grate disposed in said firebox on which fire grate fuel is supported;
(c) a cooking grill disposed above said fire grate on which cooking grill food is supported; and
(d) a pedestal stand for supporting said firebox, said pedestal stand including an upstanding hollow member having an inverted, truncated pyramidal configuration and a quadrilateral upper perimeter,
(e) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand,
(f) said upstanding member of said pedestal stand being formed with air vents for combustion air from the atmosphere to enter said upstanding member of said pedestal stand, said firebox being formed with air vents communicating with the air vents of said upstanding member of said pedestal stand for combustion air from the atmosphere to enter said firebox,
(g) said firebox comprising a baffle disposed over said air vents formed in said firebox to inhibit soot or ash from escaping through said air vents formed in said firebox.

12. An outdoor cooking unit comprising:
(a) a hollow firebox;
(b) a fire grate disposed in said firebox on which fire grate fuel is supported;
(c) a pedestal stand for supporting said firebox, said pedestal stand including an upstanding hollow member having an inverted, truncated pyramidal configuration and a quadrilateral upper perimeter,
(d) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand; and
(e) an oven supported by said upstanding member of said pedestal stand above said firebox.

13. An outdoor cooking unit comprising:
(a) a hollow firebox;
(b) a fire grate disposed in said firebox on which fire grate fuel is supported;
(c) a pedestal stand for supporting said firebox, said pedestal stand including an upstanding hollow member having an inverted, truncated pyramidal configuration and a quadrilateral upper perimeter,
(d) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand, and
(e) a wok supported by said upstanding member of said pedestal stand above said firebox.

14. An outdoor cooking unit comprising:
(a) a hollow firebox;
(b) a fire grate disposed in said firebox on which fire grate fuel is supported;
(c) a cooking grill disposed above said fire grate on which cooking grill food is supported;
(d) a pedestal stand for supporting said firebox, said pedestal stand including an upstanding hollow member having an inverted, truncated pyramidal configuration and a quadrilateral upper perimeter.
(e) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand, and
(f) a hollow cover disposed on said upper quadrilateral perimeter of said upstanding member of said pedestal stand above said cooking grill to form a cooking chamber, said cover having a truncated pyramidal configuration and a lower quadrilateral perimeter dimensioned and configured to be supported by said upstanding member of said pedestal stand, said cover being opened at its lower quadrilateral perimeter for communicating with said firebox, said cover including a plurality of panels, one of said panels having air vents for venting hot air in the cooking chamber to atmosphere, said cover including a pivotal closure mounted on said one panel for movement between the closing of said air vents in said one panel and the opening of said air vents in said one panel.

15. An outdoor cooking unit comprising:
(a) a hollow firebox;
(b) a hollow flexible liner disposed in said firebox;
(c) a fire grate disposed in said flexible liner on which fire grate fuel is supported;
(d) a cooking grill disposed above said fire grate on which cooking grill food is supported; and
(e) a pedestal stand elongated in the upright direction for supporting said firebox above the ground at a convenient height for an operator, said pedestal stand including an upstanding elongated hollow member having an inverted, truncated pyramidal configuration and a quadrilateral upper perimeter, (f) said firebox having an inverted truncated pyramidal configuration and a quadrilateral upper perimeter, said firebox being disposed generally entirely within said upstanding hollow member of said pedestal stand, said firebox being configured and dimensioned for the upper perimeter of said firebox to be supported by said upstanding member of said pedestal stand at said quadrilateral upper perimeter of said upstanding hollow member, said flexible liner having an inverted truncated pyramidal configuration, said flexible liner being configured and dimensioned to seat within said firebox.

16. An outdoor cooking unit as claimed in claim 15 wherein said pedestal stand comprising a removable ash receptacle disposed within said upstanding member to receive ash discharged into said upstanding member of said pedestal stand.

17. An outdoor unit s claimed in claim 15 and comprising a hollow cover disposed on said upper quadrilateral perimeter of said upstanding member of said pedestal stand above said cooking grill to form a cooking chamber, said cover having a truncated pyramidal configuration and a lower quadrilateral perimeter dimensioned and configured to be supported by said upstanding member of said pedestal stand, said cover being opened at its lower quadrilateral perimeter for communicating with said firebox.

18. An outdoor cooking unit as claimed in claim 17 wherein said cover includes a plurality of side panels, each of said side panels having a trapezoidal configuration, one of said panels of said cover having an access opening, said cover including a door pivotally attached to said one panel for opening and closing said access opening.

19. An outdoor cooking unit as claimed in claim 17 wherein said firebox and said cover are made of stainless steel, and said flexible liner is made of a metal foil with a reflective inner surface.

20. An outdoor cooking unit as claimed in claim 17 wherein said cover includes a plurality of panels, one of said panels having air vents for venting hot air in the cooling chamber to atmosphere, said cover including a pivotal closure mounted on said one panel for movement between the closing of said air vents in said one panel and the opening of said air vents in said one panel.

21. An outdoor cooking unit as claimed in claim 17 and comprising a motor with a vertically disposed spit supported by said cover.

22. An outdoor cooking unit as claimed in claim 17, said cover having an upper quadrilateral perimeter, said cooking unit comprising a hollow, inverted, truncated pyramidal support receiving said upper quadrilateral perimeter of said cover and seating on said cover, and a warming grill seated on said support above said cover for heating food.

23. An outdoor cooking unit comprising;
(a) a hollow firebox;
(b) a hollow flexible liner disposed in said firebox;
(c) a fire grate disposed in said flexible liner on which fire grate fuel is supported;
(d) a cooking grill disposed above said fire grate on which cooking grill food is supported;
(e) a pedestal stand elongated in the upright direction for supporting said firebox above the ground at a convenient height for an operator, said pedestal stand including an upstanding elongated hollow member having an inverted, truncated pyramidal configuration and a quadrilateral upper perimeter, (f) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand, (g) said flexible liner having an inverted truncated pyramidal configuration, said flexible liner being configured and dimensioned to seat within said firebox, (h) said upstanding member of said pedestal stand having a lower quadrilateral perimeter, said pedestal stand including a base having an upper quadrilateral perimeter; and means securing said lower quadrilateral perimeter of said upstanding member of said pedestal stand to the upper quadrilateral perimeter of said base of said pedestal stand.

24. An outdoor cooking unit as claimed in claim 23 wherein said base of said pedestal stand has a truncated pyramidal configuration.

25. An outdoor cooking unit comprising:
(a) a hollow firebox;
(b) a hollow flexible liner disposed in said firebox;
(c) a fire grate disposed in said flexible liner on which fire grate fuel is supported;
(d) a cooking grill disposed above said fire grate on which cooking grill food is supported; and
(e) a pedestal stand for supporting said firebox, said pedestal stand including an upstanding hollow member having an inverted, truncated pyramidal configuration and a quadrilateral upper perimeter, (f) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand, said flexible liner has an inverted truncated pyramidal configuration, said flexible liner being configured and dimensioned to seat within said firebox, (g) said upstanding member of said pedestal stand being formed with air vents for combustion air from the atmosphere to enter said upstanding member of said pedestal stand, (h) said firebox being formed with air vents communicating with the air vents of said upstanding member of said pedestal stand for combustion air from the atmosphere to enter said firebox, (i) said flexible liner being formed with air vents communicating with the air vents of said firebox for combustion air from the atmosphere to enter said flexible liner.

26. An outdoor cooking unit as claimed in claim 25 wherein said firebox comprises a baffle disposed over said air vents formed in said firebox to inhibit soot or ash from escaping through said air vents formed in said firebox.

27. An outdoor cooking unit comprising:
(a) a hollow firebox;
(b) a hollow flexible liner disposed in said firebox;
(c) a fire grate disposed in said flexible liner on which fire grate fuel is supported;

(d) a pedestal stand for supporting said firebox, said pedestal stand including an upstanding hollow member having an inverted, truncated pyramidal configuration and a quadrilateral upper perimeter,
(e) said firebox having an inverted truncated pyramidal configuration and a quadrilateral upper perimeter, said firebox being disposed in said upstanding hollow member of said pedestal stand, said firebox being configured and dimensioned for the upper perimeter of said firebox to be supported by said upstanding member of said pedestal stand,
(f) said flexible liner having an inverted truncated pyramidal configuration, said flexible liner
(g) an oven supported by said upstanding member of said pedestal stand above said firebox.

28. An outdoor cooking unit comprising:
(a) a hollow firebox;
(b) a hollow flexible liner disposed in said firebox;
(c) a fire grate disposed in said flexible liner on which fire grate fuel is supported;
(d) a pedestal stand for supporting said firebox, said pedestal stand including an upstanding hollow member having an inverted, truncated pyramidal configuration and a quadrilateral upper perimeter,
(e) said firebox having an inverted truncated pyramidal configuration and a quadrilateral upper perimeter,
(f) said firebox being disposed in said upstanding hollow member of said pedestal stand, said firebox being configured and dimensioned for the upper perimeter of said firebox to be supported by said upstanding member of said pedestal stand, said flexible liner has an inverted truncated pyramidal configuration,
(g) said flexible liner being configured and dimensioned to seat within said firebox; and
(h) a wok supported by said upstanding member of said pedestal stand above said firebox.

* * * * *